Oct. 16, 1923.
W. T. ROONEY ET AL
1,471,209
FRONT WHEEL ANGLE INDICATOR
Filed Sept. 21, 1922    2 Sheets-Sheet 2
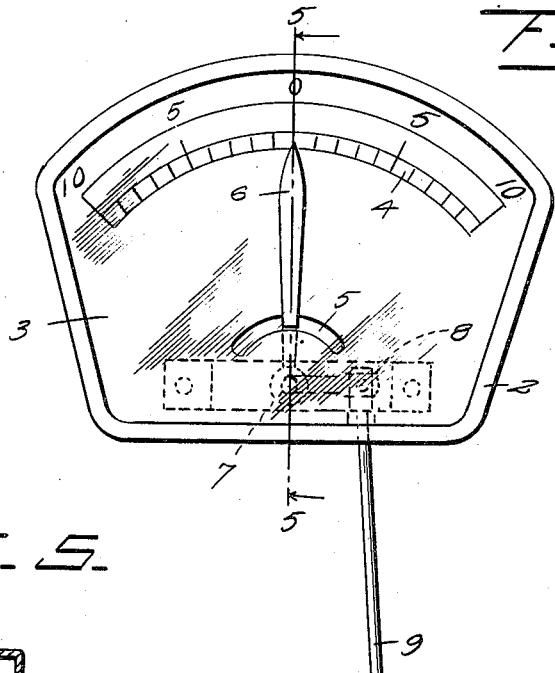
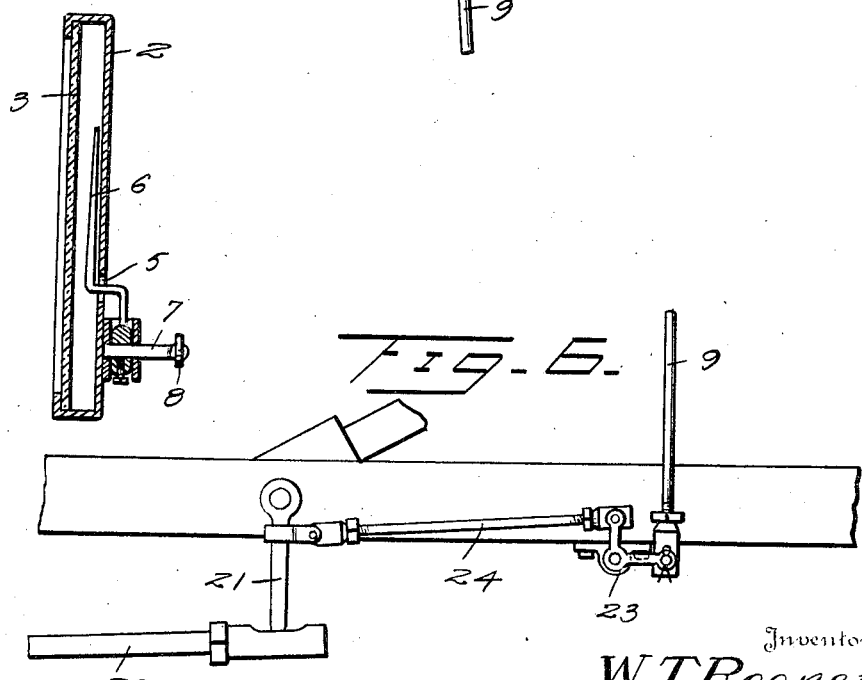
Inventor
W. T. Rooney
J. P. Hume
By
Attorney Patented Oct. 16, 1923.

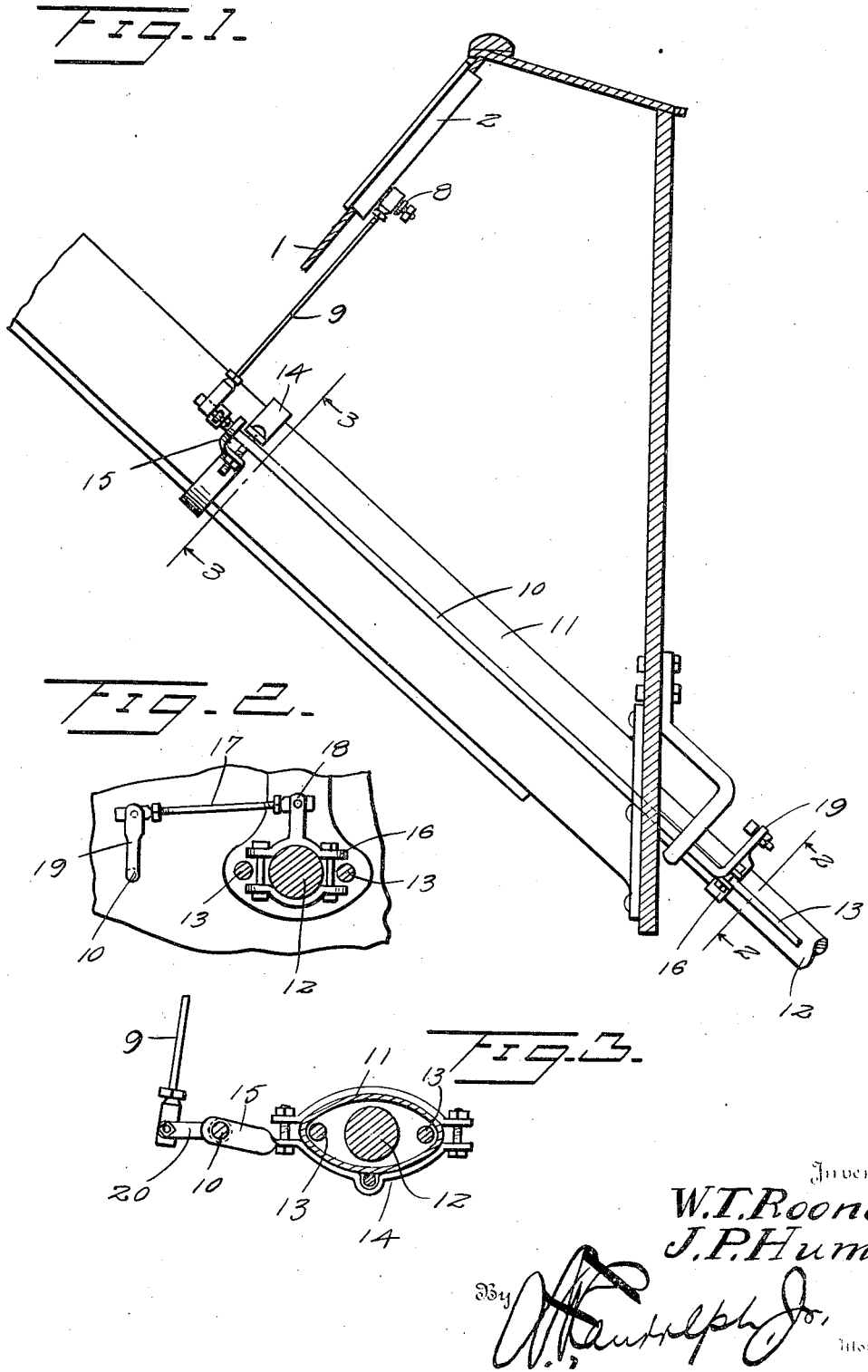

1,471,209

UNITED STATES PATENT OFFICE.

WILLIAM T. ROONEY AND JOSEPH P. HUME, OF LOS ANGELES, CALIFORNIA.

FRONT-WHEEL ANGLE INDICATOR.

Application filed September 21, 1922. Serial No. 589,616.

*To all whom it may concern:*

Be it known that we, WILLIAM T. ROONEY and JOSEPH P. HUME, citizens of the United States, residing at Los Angeles, in the county of Los Angeles and State of California, have invented certain new and useful Improvements in Front-Wheel Angle Indicators; and we do hereby declare the following to be a full, clear, and exact description of the invention, such as will enable others skilled in the art to which it appertains to make and use the same.

There exists a certain amount of play in the steering wheels of automobiles and motor vehicles and this play increases as the parts wear during the life of the vehicle and in consequence the angle of the front wheels cannot be accurately determined.

The present invention provides an indicator and intermediate connections between the indicator and the steering gear so that movement of the front wheels will result in a corresponding movement of the indicator whereby to show the angle thereof.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a detail view of a front wheel angle indicator embodying the invention, showing the same connected directly with the steering rod, Figure 2 is a sectional detail on the line 2—2 of Figure 1, looking in the direction of the arrows, Figure 3 is a section on the line 3—3 of Figure 1, viewed in the direction of the arrows, Figure 4 is a front view of the indicator, Figure 5 is a section on the line 5—5 of Figure 4, and Figure 6 is a detail view showing the indicator connections coupled to the crank arm of the steering gear.

Corresponding and like parts are referred to in the following description and designated in the several views of the drawings by like reference characters.

The indicator may be conveniently positioned so as to be readily observed and as shown in Figure 1 it is applied to the usual instrument board 1 forming a part of the dash of an automobile or motor vehicle. The indicator comprises a shallow casing 2 having a glass plate 3 fitted to and closing the front. The back of the casing constitutes a dial and is provided with suitable graduations 4 which are calibrated uniformly from a central point which corresponds with the zero of the scale so that corresponding angles may be correctly indicated to the right and left of the zero, accordingly as the front wheels are turned to the right or left. A curved slot 5 is formed in the back of the casing 2 and receives the offset portion of a pointer or hand 6 which cooperates with the scale 4. The pointer or hand 6 is secured to a shaft 7 mounted in bearings provided upon the rear of the casing 2. An arm 8 projecting laterally from the shaft 7 is connected by means of a rod 9 with the steering gear, whereby movement of the front wheels of the vehicle effect a corresponding movement of the pointer 6 which, in conjunction with the scale 4, indicate the angle of the wheels, whether the same are turned to the right or left. When the front wheels are straight ahead, the pointer 6 is opposite the zero indication of the scale and when the wheels are turned to the right or left, the pointer 6 correspondingly moves to the right or left of the zero indication of the scale 4.

Referring to Figure 1 and the detail views 2 and 3 thereof, the numeral 10 designates a steering rod or shaft mounted at one side of the steering column 11 in which is located the steering rod or shaft 12 and control rod 13. A clamp 14 is attached to the steering column 11 and is provided with an arm 15 in which the shaft 10 obtains a bearing. A clamp 16 is attached to the steering rod or shaft 12 beyond the steering column 11 and a link 17 connects an arm 18 of the clamp with an arm 19 extending laterally from the lower end of the shaft 10. An arm 20 at the upper end of the shaft 10 connects with the rod 9. It will be readily understood that as the shaft 10 is a rockably mounted member and as its arms 19 and 20 constitute right angularly related cranks, any movement of the steering rod 12 when turning the front wheels to the right or left will effect a corresponding movement of the shaft 10 and pointer 6, thereby indicating the angle of the front wheels and the direction either right or left. It is observed that the movement of the indicator is independent of the steering wheel and corresponds with the movement of the steering rod or shaft 12.

In the arrangement shown in Figure 6, the numeral 21 designates the crank connection between the steering rod or shaft and the link 22 which is coupled to the rod (not shown) which usually connects the arms of the steering knuckles of an automobile or motor vehicle. In this type of steering gear, which is well known, the rod 9 is connected to one member of a bell crank 23, the other member of the bell crank being connected by means of a rod 24 to the crank connection 21, whereby movement of the part 21 effects a corresponding movement of the front wheels and the indicator in the manner and for the purpose herein set forth.

What is claimed is:

1. An indicator comprising a case, the back of which constitutes a dial and in which is formed a curved slot, a shaft mounted upon the case and projecting therefrom, a pointer attached to the shaft exterior to the case and having an offset portion mounted in the curved slot of the case and having its end movable over the dial, and positive connecting means between said shaft and the steering gear of the motor vehicle whereby movement of the front wheels will effect a corresponding movement of the pointer to indicate the angle and direction.

2. A front wheel angle indicator comprising an indicating mechanism including a pointer, a crank arm attached to said pointer, a rod pivotally connected to said crank arm, a clamp mounted upon the steering rod, and provided with a crank arm, a second rod pivotally connected to the crank arm of said clamp and a shaft journaled upon the steering column and having angular ends pivotally connected to said rod whereby movement of the front wheels will effect a corresponding movement of the pointers.

3. A front wheel angle indicator including a pointer, a crank arm attached to said pointer, a rockably mounted member having angularly related crank arms, a link rod pivotally connected to said first named crank arm and to one of the crank arms of said member, a clamp connected to the steering mechanism, and a link rod pivotally connected to the other arm of said member and to said last named clamp.

In testimony whereof we affix our signatures in presence of two witnesses.

WILLIAM T. ROONEY
JOSEPH P. HUME.

Witnesses:
WILLIAM L. YEAGER,
JOHN ROEDER.